United States Patent
Williams et al.

(10) Patent No.: US 11,948,419 B2
(45) Date of Patent: *Apr. 2, 2024

(54) DEVICES FOR GAMING

(71) Applicant: CG TECHNOLOGY DEVELOPMENT, LLC, Las Vegas, NV (US)

(72) Inventors: Paul Williams, New York, NY (US); Phillip L. Flaherty, Las Vegas, NV (US); Quinton Singleton, Henderson, NV (US); Kathleen Tam, Las Vegas, NV (US); Matthew Morrissette, Las Vegas, NV (US)

(73) Assignee: CG TECHNOLOGY DEVELOPMENT, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,407

(22) Filed: Sep. 26, 2022

(65) Prior Publication Data
US 2023/0024654 A1 Jan. 26, 2023

Related U.S. Application Data

(63) Continuation of application No. 16/742,418, filed on Jan. 14, 2020, now Pat. No. 11,455,862, which is a
(Continued)

(51) Int. Cl.
*A63F 9/24* (2006.01)
*G07F 17/32* (2006.01)

(52) U.S. Cl.
CPC ...... *G07F 17/3206* (2013.01); *G07F 17/3209* (2013.01); *G07F 17/3225* (2013.01); *G07F 17/3237* (2013.01); *G07F 17/3241* (2013.01); *G07F 17/3246* (2013.01); *G07F 17/3251* (2013.01)

(58) Field of Classification Search
None
See application file for complete search history.

(56) References Cited

U.S. PATENT DOCUMENTS

| 6,709,333 B1 * | 3/2004 | Bradford | G07F 17/32 463/29 |
| 7,980,948 B2 * | 7/2011 | Rowe | G07F 17/32 463/20 |

(Continued)

*Primary Examiner* — Sunit Pandya

(57) ABSTRACT

A computing device for gaming by patrons. An identification acceptor may scan an identification document into digital form. A biological sensor such as a camera may obtain biological data describing a human patron. A currency acceptor and dispenser may accept money. The computing device may obtain biological data describing the patron. The computing device may verify the identity of the patron and acceptability of the patron for gaming based at least in part on the digital form of the patron's identification and the biological data. The computing device may accept currency for deposit into a wagering account. Once the patron is verified and the account is funded, the computing device may offer gaming activities to the verified patron out of the wagering account, and pay out gaming winnings at the currency dispenser.

20 Claims, 5 Drawing Sheets

Related U.S. Application Data continuation of application No. 15/049,679, filed on Feb. 22, 2016, now Pat. No. 10,553,073, which is a continuation of application No. 13/942,146, filed on Jul. 15, 2013, now Pat. No. 9,269,224, which is a continuation-in-part of application No. 13/837,224, filed on Mar. 15, 2013, now Pat. No. 9,240,098.

(60) Provisional application No. 61/776,748, filed on Mar. 11, 2013.

(56) References Cited

U.S. PATENT DOCUMENTS

| | | | | |
|---|---|---|---|---|
| 2003/0228898 | A1* | 12/2003 | Rowe | G07C 9/37 463/25 |
| 2004/0038733 | A1* | 2/2004 | Walker | G07F 17/3244 463/25 |
| 2004/0147309 | A1* | 7/2004 | Chamberlain | G07F 17/42 463/25 |
| 2005/0026670 | A1* | 2/2005 | Lardie | G07F 17/32 463/16 |
| 2005/0054417 | A1* | 3/2005 | Parrott | G07F 17/32 463/16 |
| 2006/0281543 | A1* | 12/2006 | Sutton | G07F 17/3239 463/29 |
| 2008/0268934 | A1* | 10/2008 | Mattice | G07F 17/3234 463/16 |
| 2011/0014975 | A1* | 1/2011 | Grabiec | G07F 17/34 463/31 |

\* cited by examiner

DEVICES FOR GAMING

CROSS-REFERENCE TO RELATED APPLICATIONS

This application is a continuation of U.S. patent application Ser. No. 16/742,418 filed Jan. 14, 2020, which is a continuation of U.S. patent application Ser. No. 15/049,679 filed Feb. 22, 2016 (now U.S. Pat. No. 10,553,073 issued Feb. 4, 2020), which is a continuation of U.S. patent application Ser. No. 13/942,146 filed Jul. 15, 2013 (now U.S. Pat. No. 9,269,224 issued Feb. 23, 2016), which is a continuation-in-part of U.S. application Ser. No. 13/837,224 filed Mar. 15, 2013 (now U.S. Pat. No. 9,240,098 issued Jan. 19, 2016) and a non-provisional of U.S. Provisional Application No. 61/776,748 filed Mar. 11, 2013. The '224 application is incorporated by reference. From the '748 application, ¶¶[0001] to [0030] and the figures are incorporated by reference.

BACKGROUND OF THE INVENTION

This application relates to network-type amusement devices including means for processing electronic data (e.g., including computer/video game, etc.)

SUMMARY OF THE INVENTION

In general, in a first aspect, the invention features a kiosk or computing device for gaming by patrons. The kiosk has a housing designed to hold a processor, identification acceptor, and biological sensor(s), and to permit installation at a site for interaction with human patrons. The identification acceptor mounted in the kiosk housing is designed to accept an identification document(s) and to scan identification information from the identification document(s) into digital form for transmission over a network. One or more biological sensor(s) mounted in the kiosk housing is oriented to obtain biological data describing a human patron at the kiosk or computing device into digital form for transmission over a communication network. Input-output device(s) mounted in the kiosk or computing device housing is designed to accept registration/login information and gaming commands from a human patron and to present information to the human patron for interactive gaming. One or more microprocessors mounted in the kiosk housing are programmed to: present instructions to the human patron through the input-output device(s), including an instruction to the patron to insert an identification document(s) into the identification acceptor; obtain a digital form of the patron's identification from the identification acceptor; obtain biological data describing a biological feature of the patron from the biological sensor; verify the identity of the patron and acceptability of the patron for gaming based at least in part on the digital form of the patron's identification and the biological data; and on verification, to offer gaming activities to the verified patron.

In general, in a second aspect, the invention features a kiosk or computing device for gaming by patrons. A kiosk or computing device housing holds a processor, input/output devices, currency acceptor and dispenser, to protect them against intrusion, and to permit installation at a site for interaction with human patrons. Input-output device(s) accept registration/login information and gaming commands from a human patron and to present information to the human patron for interactive gaming. A currency acceptor and dispenser mounted in the housing accepts currency and dispense currency for gaming. One or more microprocessors are programmed to: present instructions to the human patron through the input-output device(s), including an instruction to the patron to register and verify the patron's identity; accept currency at the currency acceptor for deposit into a wagering account held in an off-site computer; on verification and acceptance of currency, offer gaming activities to the verified patron out of the wagering account; and pay out gaming winnings from the wagering account at the currency dispenser.

In general, in a third aspect, the invention features a method. By an output device of a computing device that has a processor and memory, instructions are presented to the human patron through the input-output device(s), including an instruction to the patron to register and verify the patron's identity. At input-output device(s) of the computing device, registration and identification information are accepted from a human patron. The identity of the biological patron is verified against a legal identity to validate legal entitlement to participate in gaming activities. Funds are accepted at a funds acceptor for deposit into a wagering account held for wagering activities hosted in off-site computer(s) at two or more different gaming operators, the gaming operators being distinct legal entities from an operator of the computing device.

Embodiments of the invention may include one or more of the following features. The biological sensor may be a camera and the biological data may be a digital image of a face of the patron captured by the camera. The biological sensor may be a signature pad and the biological data may be a digital representation of the patron's signature. The patron identity may be verified based at least in part on face recognition and comparison of the digital image against a reference photograph. The identity of the patron may be verified based at least in part on a verification received from an off-site verification office in response to the digital image of the patron's face and at least part of the digital identification data. The identity of the patron may be verified based at least in part on transmitting the biological data to an off-site verification office. The identity of the patron may be verified based at least in part on processing by a microprocessor in the kiosk or computing device. The identity of the patron may be verified based at least in part on analysis of the biological data against a reference in a microprocessor mounted in the kiosk or computing device. The identification acceptor may be designed to accept and scan a government-issued driver's license, passport or identification card. The identity of the patron may be verified based at least in part on information regarding a financial account of the patron. The identity of the patron may be verified based at least in part on analysis of the biological data against databases of government and/or regulatory authorities.

The above advantages and features are of representative embodiments only and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION

Figure 1A:
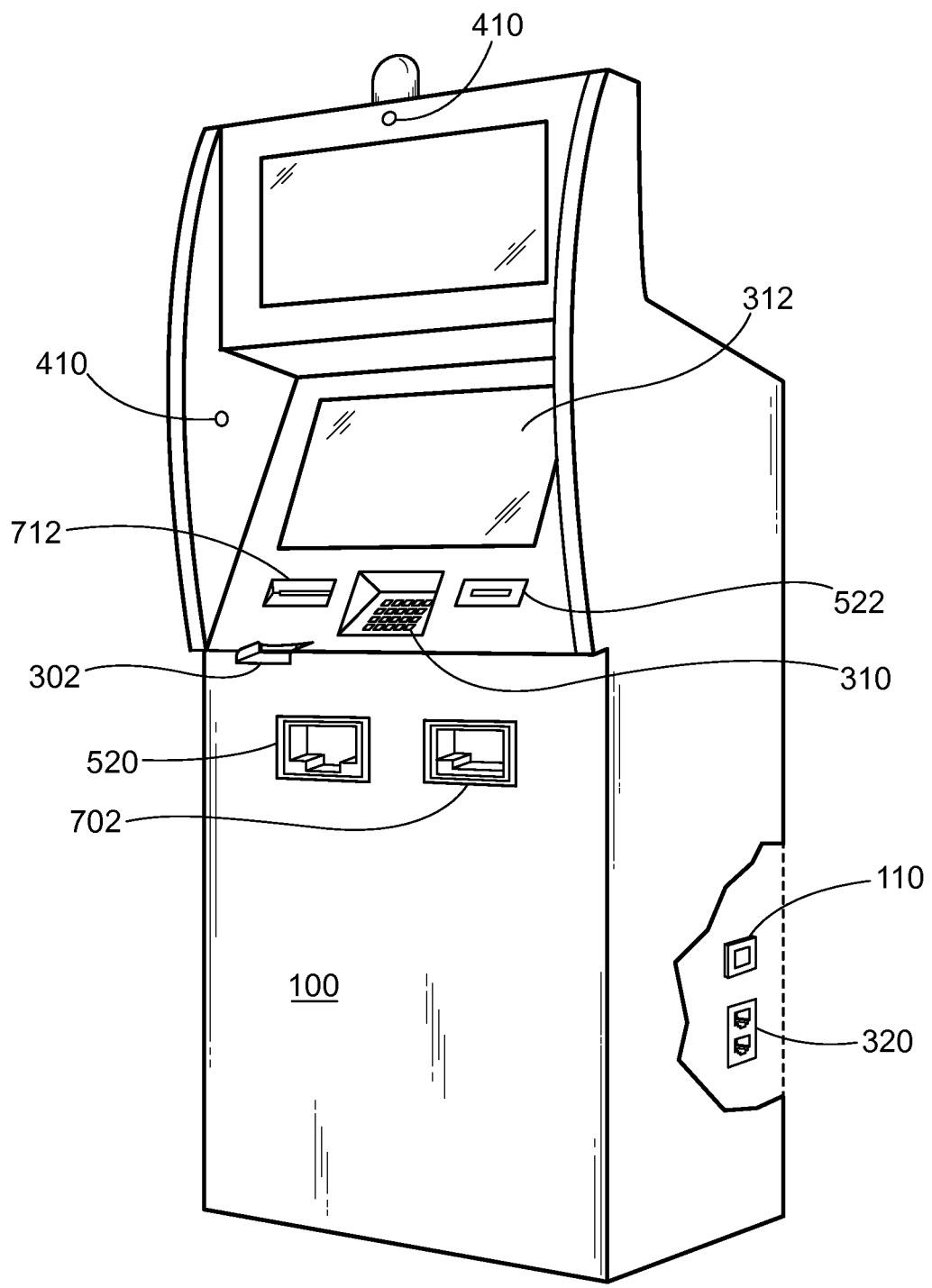
FIG. 1(a) is a perspective drawing of a gaming kiosk.

Gaming and other financial transactions may be facilitated by computing device 100 that has the ability to obtain input to verify a person's identity. The computing device may be a purpose-designed device, such as a purpose-designed kiosk, or may be a conventional computer with a camera and facial recognition software, iris scan or fingerprint scan, or the like. Computing device 100 may be used to register a new user or patron for an account or may be used for day-to-day transactions such as gaming activities, ATM cash transactions, or the like.

Patron 130 may use computing device 100 to:

Register/establish an account, access and conduct transactions to the account, for gaming or other financial activities.

create a unique identifier for future access/transactions.

engage in gaming activities and conduct transactions related to gaming.

transfer funds to, from, and/or between accounts, withdraw funds from accounts (including payment back to debit/credit/stored value cards or some other form of payment back, such as digital currency or points) and conduct transactions related to the accounts.

confirm/verify the identity of the person accessing the accounts or engaging in transactions is permitted under the laws of the applicable jurisdiction.

In some cases, these activities may be supported by computing device 100 (purpose-designed kiosk, mobile device, tablet, phone, PC, terminal station, etc.) that connects to a gaming operator 140 or other financial institution over a network. In some cases, computing device 100 may have sufficient input/output devices to gather sufficient information to confirm all necessary identity and permission information; in other cases, computing device 100 may gather information to forward to a live person for confirmation or verification.

In some cases, administrative/registrar entity 150 may perform tasks, functions or administrative functions on behalf of or for gaming operator 140 related to patrons 130 of a gaming operator or on behalf of the gaming operator. In some cases, administrative/registrar entity 150 may be an agent of gaming operator 140 and may be an entity that the gaming operator trusts (i.e., a trusted entity). In some cases, administrative/registrar entity 150 may be an automated process. In some cases, administrative/registrar entity 150 may assist gaming operator 140 with registering/signing up new patrons, with accepting funds/money from patron 130 and depositing these funds in the patron's gaming account for patron 130 to bet/wager with, with receiving requests from patron 130 to withdrawal funds from the patron's account and paying patron 130 the withdrawn funds, etc. In some cases, administrative/registrar entity 150 may perform functions related to patron administration/administrative functions (such as patron registration, fund deposit, fund withdrawal, etc.) for a gaming operator(s) 140. In some cases, administrative/registrar entity 150 may also perform other functions for gaming operator 140, such as marketing. In some cases, administrative/registrar entity 150 may perform administrative functions for a gaming operator(s) 140 but may also perform other functions completely separate from gaming operator 140. Gaming operator 140 may issue to administrative/registrar entity 150 a unique ID(s) 154. Administrative/registrar entity 150, when performing tasks for gaming operator 140, may authenticate itself to the gaming operator 140 through ID 154.

I. Kiosk or Computing Device 100

Figure 1B:
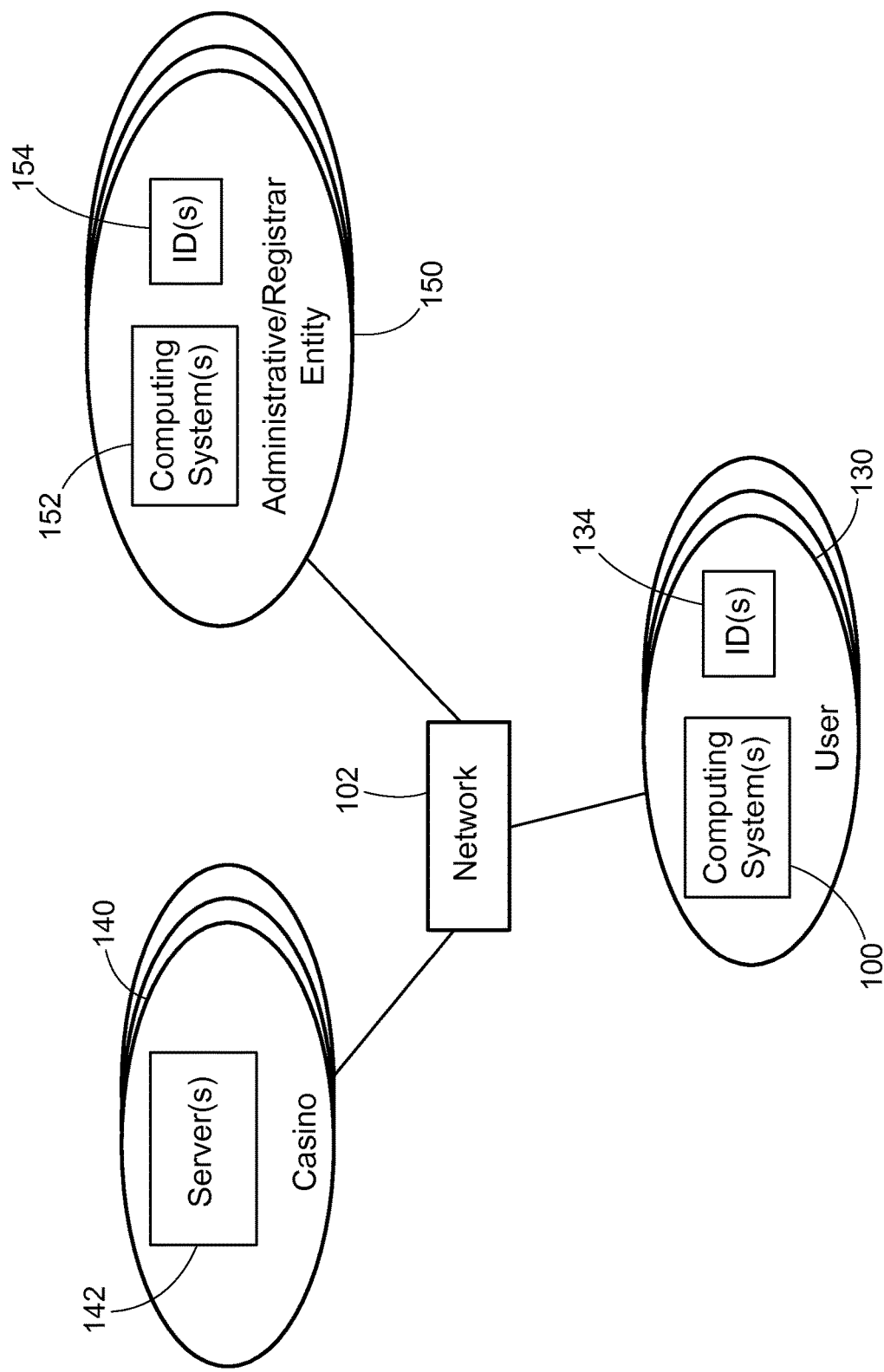
FIG. 1(b) is a schematic diagram of a computer network.

Referring to FIG. 1, kiosk or computing device 100 for gaming applications may have components that permit verification and registration of a patron, adding money into an electronic wallet, paying out winnings, and entering commands to engage or participate in various gaming activities and/or gaming related transactions. Kiosk or computing device 100 may have one or more microprocessors 110, ID card acceptor 302, keypad 310, one or more display screens 312, one or more cameras 410, one or more network connectors 420, acceptor 522 for credit/debit/stored value/ATM card, PayPal account, digital currency or points or some other form of funding, currency and/or coin validator/acceptor 520, currency and/or coin dispenser 702, printer 712, and nonvolatile storage.

Kiosk or computing device 100 may have one or more connectors 420 to various networks. Security may be improved if these connectors 420 should have static IP addresses. In some cases kiosk or computing device 100 may have dual connectors 420, one connector 420 to the public internet, and a second connector 420 to a financial transaction network, such as the ATM network, the FIX, FAST, or SWIFT networks, etc.

Kiosk or computing device 100 may have multiple microprocessors 110. For example, one microprocessor may perform all management and interconnection of the various devices, while gaming, gaming related transactions and other user-level software may execute on a second processor. This provides some isolation against intrusion.

Screen 312 may be a touch-sensitive display.

Kiosk or computing device 100 may have additional input/output devices for gaming and gaming related transactions, such as keypads, card swipe terminals, readers or scanners, joysticks, touchpads, trackballs, pushbuttons, a slot machine arm, loudspeakers, haptic transducers (for example, as described in U.S. patent application Ser. No. 11/754,944, "Game with Hand Motion Control," filed May 29, 2007, incorporated by reference), etc.

Currency acceptors/dispensers/cassettes 520, 702 suitable for use are available from Fujitsu and other companies.

Kiosk or computing device 100 may have an uninterruptible power supply.

A light on kiosk 100 may be used to illuminate patron 130 for photography, and/or may alert staff when assistance is required, when there is a large payout, or when there is an error at kiosk 100.

In some cases, gaming related transactions, such as account registration, or other gaming and account interaction may be provided through a general purpose computer 100 or other computing device 100, such as a desktop computer, laptop or tablet computer, mobile phone, or specialized computing device, that provides the requisite input/output, networking, and computational capabilities.

Kiosk or computing device 100 may use cameras, thumbprint readers, facial recognition, iris scan, voice recognition, thermal emanation verification, signature readers, fingerprint or handprint readers, or other biometric devices to obtain identification verification information. Kiosk or computing device 100 may have a keyboard (physical, on-screen soft keys, or other) to accept an account number, patron ID number, personal identification number, social security number, taxpayer ID number, or other identification number. Kiosk or computing device 100 may have one or more readers that accept government documents (such as driver's license, government issued ID card, passport), ID cards issued by a specific commercial operator (such as a patron ID card issued by gaming operator 140), or credit, debit, stored value or ATM cards or some other form of identification. Kiosk or computing device 100 may have other similar devices that gather information that tends to validate personal identity. In some cases, the device may be installed at the factory, such as a camera or thumbprint reader that is typically found on laptop computers or mobile phones. In other cases, the device may be an aftermarket plug-in, such as USB devices that plug in to computers, or devices that plug into the expansion port of devices such as the dock connector of an Apple iPhone, or devices that connect through blue tooth or other wireless technology, to kiosk or computing device 100. In some cases, a specific institution may assemble multiple sensors into a specialized device that may be issued to a specific person for the duration of gaming activities or an account relationship. In some cases, kiosk or computing device 100 may have two, three, four, or more separate devices to gather identification information. Such separate device(s) may be issued to a specific person for the duration of gaming activities or an account relationship by a specific institution. In some cases, kiosk 100 may be a docking station with certain I/O and verification devices that allows a patron to connect his or her personal device to allow registration, account transactions, etc.

II. Administrative/Registrar Entity 150

In some cases, gaming operator 140 may contract with a third-party administrative/registrar entity 150 to perform certain gaming functions, such as patron registration, verification, age and identity checking, and the like. Administrative/registrar entity 150 may operate as a customer-facing "retail" vendor of gaming activity that is hosted by a central gaming operator or licensee 140. By law, if gaming activities conducted through administrative/registrar entity 150 involve gaming for value, then gaming operator or licensee 140 may be under an obligation to do due diligence on administrative/registrar entity 150 to ensure compliance with all other gaming law. If the gaming activities are not for value (just play for fun), then gaming operator or licensee 140 may contract with administrative/registrar entity 150 at will. In some jurisdictions, administrative/registrar entity 150 may be subject to licensing requirements separate from and in addition to the licensing requirements of gaming operator or licensee 140.

In some cases, administrative/registrar entity 150 may be a bank/bank teller, an owner of a store, a notary, a lawyer, a payment or funds processor, etc. Administrative/registrar entity 150 may perform other and/or additional functions for gaming operator 140 and may perform functions for multiple different gaming operators 140. In some cases, one gaming operator 140 may register a patron 130, and make that registration available as administrative/registrar entity 150 to other gaming operators 140. Multiple administrative/registrar entities 150 may operate. A given administrative/registrar entity 150 may be associated with one gaming operator 140 exclusively or may be associated with a plurality of gaming operators 140. In some cases, two or more gaming operators may be affiliated (such as through a common owner, through agreement, etc.). Here, administrative/registrar entity 150 may have/use the same ID 154 to perform functions for affiliated gaming operators.

In some cases, administrative/registrar entity 150 may collect a common registration 134 for a single patron 130 that is accepted by multiple gaming operators 140. In some cases, administrative/registrar entity 150 may act as custodian for an account of patron 130 and may have agreements with the gaming operators 140 to allow patron 140 to access that account from each gaming operator. This may permit all gaming operators to have a common view of the patron's finances, to limit excessive credit risk to a single patron 130. In some cases, the administrative/registrar entity 150 may segregate patrons for gaming, related gaming transactions or other purposes, such as custodial purposes, such segregation may be by location, gaming operator, jurisdiction, etc. In some cases, administrative/registrar entity 150 or kiosk or computing device 100 may limit access to gaming based on permissions provided by patron 130, gaming operator 140, administrative/registrar entity 150, governmental or regulatory authorities, or other users.

Administrative/registrar entity 150 may have one or more physical locations that patron 130 can physically visit. Such location(s) may be physically separate from and/or remote from gaming operator 140. Administrative/registrar locations 150 may be physically dispersed over a geographic area, such as a town, city, state, nation, international waters, multiple jurisdictions, etc.

Administrative/registrar entity 150 may assist gaming operator 140 by performing identity verification of patrons 130. For example, administrative/registrar entity 150 may physically view patron 130 and a photo ID of that patron and verify to the gaming operator that "John Doe" is in fact "John Doe" (example name). Administrative/registrar entity 150 may call the gaming operator 140 and/or enter into a computer system that in fact administrative/registrar entity 150 has made this visual verification and authenticate this information to gaming operator 140 through the use of ID 154. In other words, through the use of the ID 154, the gaming operator may trust that gaming operator is communicating with a trusted agent and therefore trust the information received from administrative/registrar entity 150.

ID 154 may take various forms. For example, ID 154 may be a login and/or password. As another example, in addition to or in place of a login/password, ID 154 may simply be a value, encryption key or other electronic security cookie/token that administrative/registrar entity 150 knows and provides when necessary. ID 154 may be encoded on a card (e.g., an RFID card, magnetic strip, bar code, etc.) that administrative/registrar entity 150 may swipe through a reader and thereby provide ID 154 to gaming operator 140. ID 154 may be encoded or otherwise transferred into kiosk or computing device 100 or computing system 152. ID 154 may be encoded on a memory device/memory stick that administrative/registrar entity 150 inserts into a computer thereby providing ID 154 to gaming operator 140 140. As another variation, administrative/registrar entity 150 may need to provide a biometric (e.g., retina scan, fingerprint, etc.) to verify the identification of entity 150, in conjunction with providing ID 154.

Administrative/registrar entity 150 may have more computing systems 152 such as a computer, server, laptop, computing pad, smart phone etc. that may intercommunicate with a server 142, for example. Such a computing system 152 may be dedicated to interworking with a gaming operator(s) 140/server(s) 142 (one computing system 152 may interwork with only one gaming operator and therefore administrative/registrar entity 150 may need multiple systems, and/or computing system 152 may interwork with many gaming operators), and/or may be a general purpose device. Such a computing system may include one or more processors and one or memories and/or be interfaced to one or more external memories, such as one or more and/or databases. Computing system 152 may include one or more network hardware/software/firmware based interfaces that enable the device to connect to and communicate over network 102. Computing system 152 may also have one or more software and/or firmware and/or hardware based application(s) that execute on the computing system to intercommunicate with gaming operator 140/server 142. As another example, computing system 152 may interwork with gaming operator 140/server 142 through a web based application hosted by server 142. Other variations are possible.

III. Patron Registration, Login, and Verification

Figures 2, 3:
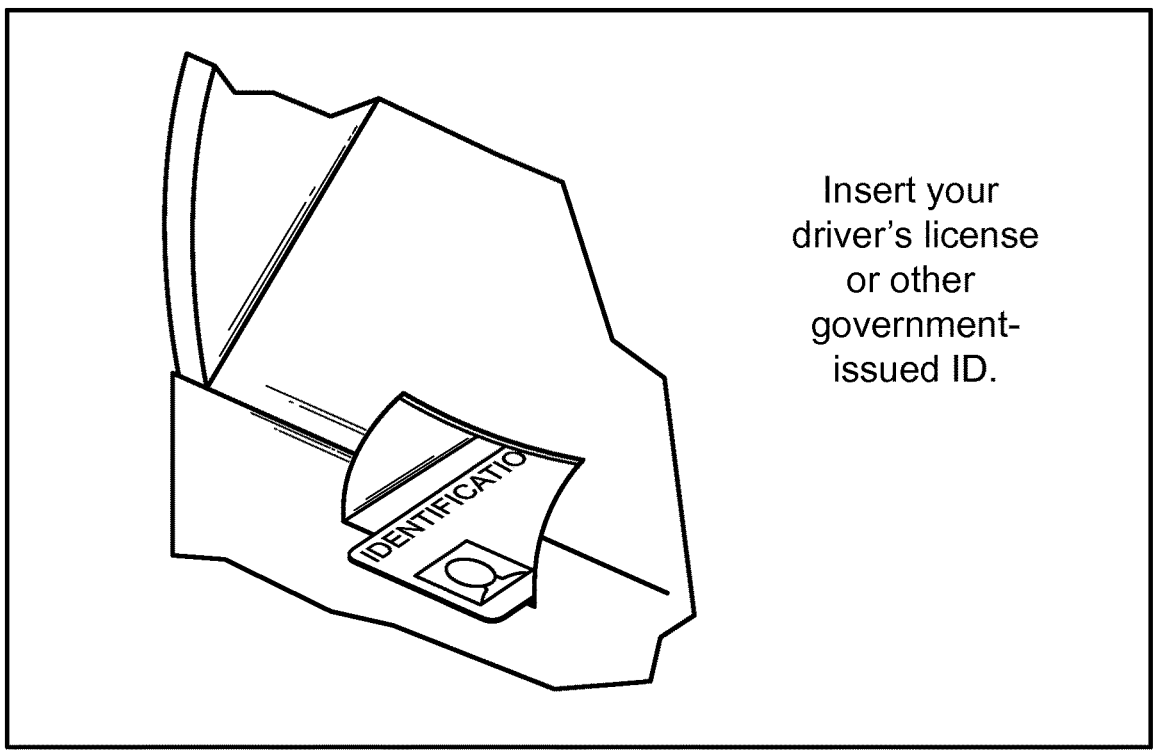
FIGS. 2-6 are screen shots.

Referring to FIG. 2, kiosk or computing device 100 may invite patrons to engage in gaming activities or related gaming transactions by displaying a screen that asks patrons to insert or provide information from a casino patron card or account, a driver's license, passport, or other government issued ID into ID acceptor 302 and/or using keypad 310 or softkeys displayed on screen 312.

Referring to FIG. 3, when patron 130 inserts an ID into ID acceptor 302 or scans or provides a picture of an ID, microprocessor may instruct ID acceptor 302 to scan the ID card or collect the information from the ID card and populate a registration information template 304 for display to patron 130 on screen 312. Patron 130 may fill in whatever fields are not ascertainable from the ID card that was inserted, scanned or photographed, using keypad 310 or softkeys displayed on screen 312.

Figure 4:
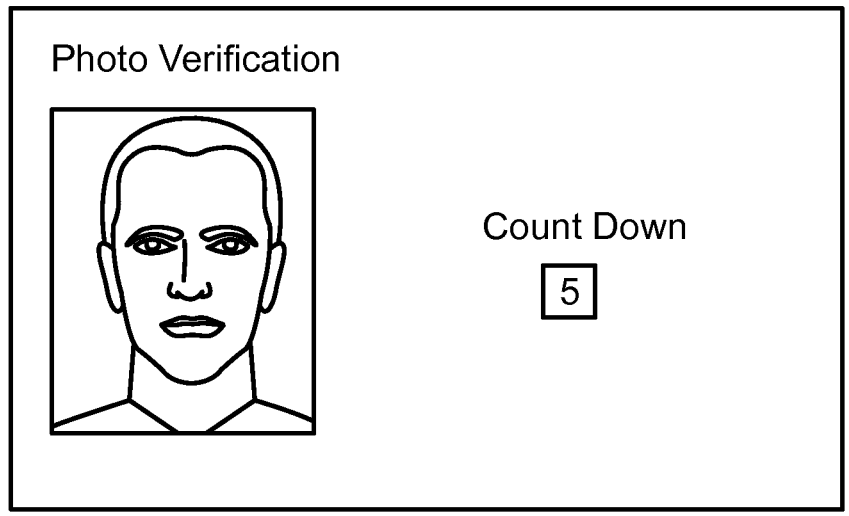

Referring to FIG. 4, kiosk or computing device 100 may then display an invitation to patron 130 to stand in front of camera 410 so that a photograph of the patron's actual face can be captured by camera 410. Kiosk or computing device 100 may display the current picture from camera 410 and ask patron 130 to pose and give a countdown until the picture will be taken. Once the picture is taken by camera 410, the image may be stored in digital form.

In some cases, kiosk or computing device 100 may request a credit, debit, stored value or ATM card or some other form of funding, such as digital currency or points, at credit/debit/stored value/ATM card or some other form of funding, such as digital currency or points, acceptor 522 or by patron inputting information to gather additional information for verification. Credit/debit/stored value/ATM card or some other form of funding, such as digital currency or points, acceptor 522 may be programmed to gather a digital image of a signature from the card or other funding source to use in verification.

In some cases, kiosk or computing device 100 may request entry of a bank transfer number and account number, a wagering account number, credit/debit/stored value/ATM card or some other form of funding, such as digital currency or points, or a PayPal or other account number and password, to gather verification information.

In some cases, kiosk or computing device 100 may have a signature pad to gather a signature from patron 130. In some cases, kiosk or computing device 100 may have a thumb scan or device to gather fingerprint data from patron 130. In some cases, kiosk or computing device 100 may have an iris scan sensor to gather an iris scan from patron 130. In some cases, kiosk or computing device 100 may have anyone, two, three, four, or more of the biometric or identity devices listed above.

In some cases, kiosk or computing device 100, computer 152 of administrative/registrar entity 150, or some other computer of the gaming system may send an email to an email address 330 or an SMS text to a phone number designated by patron 130 to obtain further verification.

Kiosk or computing device 100 may ascertain a tax status for patron 130—the patron's tax domicile, whether patron 130 has existing tax withholding paperwork registered with an entity that operates the gaming activities at kiosk or computing device 100, etc. Kiosk or computing device 100 may gather any information remaining needed to generate any W-2G, 1099, 1042 S, or similar tax reporting to the federal government, state government, or other tax jurisdiction. The information may be gathered from patron 130, gaming operator 140 140, or administrative/registrar entity 150.

After all patron identification/verification information is received, kiosk or computing device 100 may verify the identity of patron 130, and his/her suitability/acceptability/permissibility for registration and/or access to a financial or gaming account and/or for gaming activities and/or related gaming transactions. The verification may determine suitability/acceptability/permissibility on a jurisdiction by jurisdiction basis and/or by gaming activity by gaming activity basis and/or by related gaming transaction by related gaming transaction basis. For example, kiosk 100 or another computer of the gaming system may have information that indicates that patron 130 is permitted to engage in card table games in Nevada or off-track betting in New York, and for-fun gaming in Texas, but not gaming-for-value in Texas.

In some cases, verification may involve a remote computer and/or remote human. Patron ID information, digital image from camera 410, a digital image of the signature, and/or other verification information may be forwarded over one of network links 420 to a supervisory office. Verification may be performed by computer. In other cases, a human at the supervisory office may review the information, photographs, and/or signature. The human at the supervisory office may compare the live photograph from camera 410 against the photo scanned from the ID card photographs to verify the patron's identity. The human may verify that patron 130 is eligible for use of the gaming system, and that patron 130 has a valid account on the gaming system.

In some cases, kiosk or computing device 100 may use verification software hosted on local microprocessor 110 to analyze and verify identity and suitability acceptability/permissibility of patron 130. For example, facial recognition software, signature verification software, and/or other identity verification techniques may be used.

Figure 5:
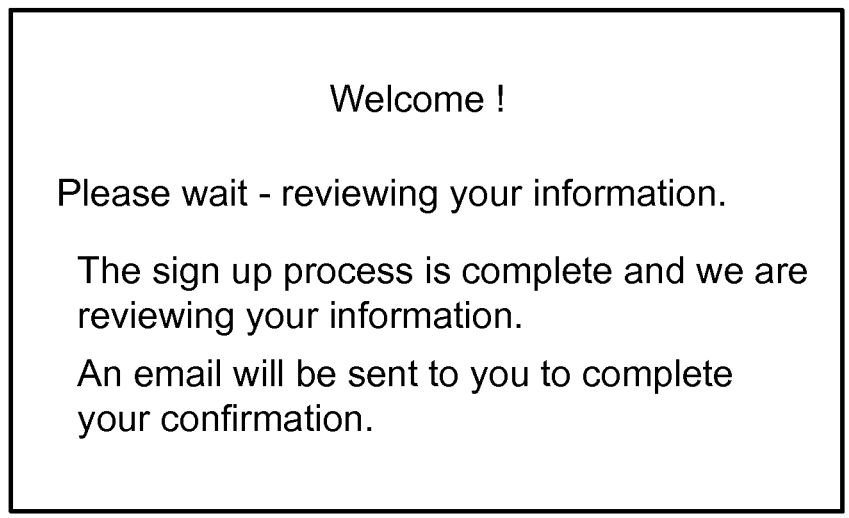

Referring to FIG. 5, once verification is complete and approved, the supervisory office may either send a message to kiosk or computing device 100 for display to patron 130, or may send an email to the patron's email address, explaining either that patron 130 is verified, additional information or action is required, or that verification has failed, as the case may be.

Once patron 130 is verified, patron 130 may establish a wallet or patron wagering account or engage in gaming and/or gaming related transactions. Kiosk or computing device 100 may request any additional information not already received that is necessary to establish the account. In addition, this may be a convenient time to gather any information required for tax withholding and reporting. In some cases, gathering any information required for tax withholding and reporting may be required before establishing the account. In other cases, such information gathering may be deferred until patron 130 has winnings great enough to trigger an obligation to prepare a tax filing, as described in U.S. Pat. No. 8,210,931, incorporated by reference. Patron 130 may fund the wallet or wagering account by inserting cash, check, a credit, debit, stored value or ATM card or some other form of funding, such as digital currency or points, or a value ticket or voucher, such as casino slot machine ticket, into appropriate acceptor devices of kiosk or computing device 100. For example, an "add deposit" button on the kiosk's home page may lead to a series of screens where kiosk or computing device 100 asks patron 130 how much money is to be deposited, and in what form, and then leads patron 130 to insert cash into bill acceptor 520, or card credit or other source of funding into acceptor 522, or the like, to fund the patron's wallet or wagering account.

In some cases, patron 130 may be able to enroll himself or herself in problem gaming programs, such as setting self-imposed limits on wagering or losses, or self-imposed restrictions on types of gaming to which the patron wishes to limit him/herself. In cases where administrative/registrar entity 150 accepts a common registration to be used by multiple gaming operators 140, those self-imposed limits or restrictions may be provided by administrative/registrar entity 150 to the multiple gaming operators 140, and may receive data from the multiple gaming operators 140 to maintain the sum of the patron's gaming activity, stop-loss maximum on losses, for all gaming operators at the patron's self-imposed limit.

Figure 6:
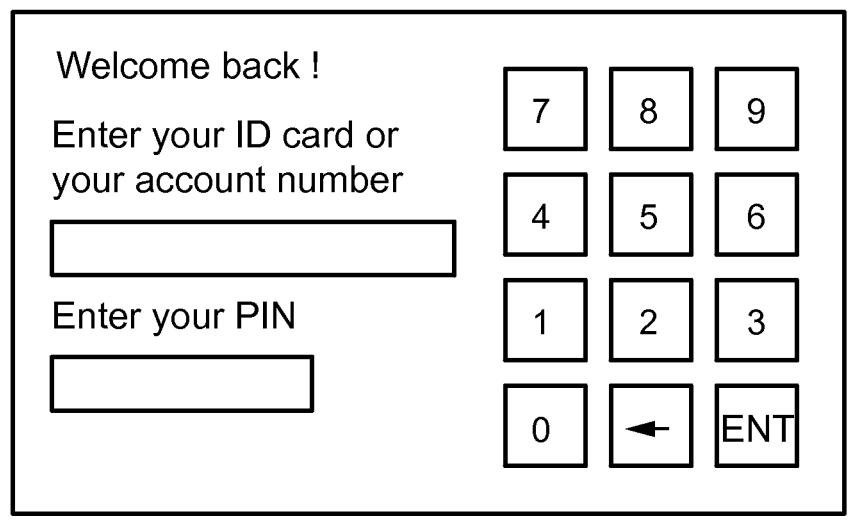

Referring to FIG. 6, when patron 130 returns in the future, patron 130 may be able to use a shorter-form sign-in, by entering an account number and PIN, or a card and a PIN, or the like. This login may fail if the account is expired or locked out, if the PIN is incorrectly entered, if the backing bank account cannot be accessed, if patron 130 verification from FIG. 5 is not yet complete or was refused, if the patron's email address or telephone number cannot be verified, etc.

In some cases, before patron 130 begins using the services of gaming operator 140 (e.g., engaging in gaming or gaming related transactions), patron 130 may need to register with gaming operator 140 to become an authorized patron and/or to create a gaming account and/or engage in gaming or gaming related transactions. In some cases, patron 130 may register (or verify identity for subsequent visits) in person at gaming operator 140, or in person with administrative/registrar entity 150. In some cases, patron 130 may register or verify remotely via a computing system, such as computing device 100. In some cases, patron 130 may register or verify by some combination of steps partially in person and partially via a computing system. In some cases, patron 130, via a computing device 100, may access a web site hosted by a server 142 (patron 130 may access server 142 in other fashions). Via that web site, patron 130 may indicate a desire to register with the gaming operator 140. As part of the registration, server 142 may prompt patron 130 may to enter at computing device 100 an identity (e.g., first and/or last name), date of birth, physical address of residence, social security number, and/or email address, etc. Assuming the registration is successful, in return server 142 may assign an ID(s) 134 to patron 130, such as login and password. The login and/or password may be chosen by patron 130 and/or server 142. As part of registration, server 142 may also prompt patron 130 to answer one or more questions (such as, for example, first pet/pet name, high school/college graduated from, mother's maiden name, etc.). Assuming the registration is successful, patron 130 may also add funds to a gaming account (assuming the wagering is for money) as part of the registration. For example, patron 130 may provide a credit card or other source of funding to fund the account, fund the account via PayPal, may wire transfer funds to the account, etc. As another example, patron 130 may mail in a check, etc. Patron 130 may fund the account in other manners. Once the account is open, patron 130 may be able to begin gaming activity. In some cases, patron 130 may deposit funds via administrative/registrar entity 150. In some cases, patron 130 may transfer funds between patron 130 accounts and/or accounts of other patrons 130.

In some cases, as part of registration, patron 130 may also verify to gaming operator 140 one or more pieces of information provided to gaming operator 140 during registration. For example, patron 130 may need to verify that he indeed is the person he entered/identified to the system during registration. Accordingly, as part of registration, server 142 may inform patron 130 via computing device 100, for example, that patron 130 needs to physically visit administrative/registrar entity 150 to authenticate/verify to gaming operator 140 that patron 130 is who he says he is. Server 140 may also inform patron 130 as to one or more documents patron 130 needs to provide administrative/registrar entity 150 (such as license, passport, photo ID, tax bill, social security card, utility bill, etc.) to verify this information. Server 142 may provide patron 130 with the name and/or location of one or more administrative/registrar entities 150. Server 142 may also force patron 130 to choose administrative/registrar entity 150 and/or assign patron 130 to administrative/registrar entity 150. Here, server 142 may notify that administrative/registrar entity 150 in advance (such as electronically via computing system 152) that patron 130 will be coming to complete registration. Server 142 may also warn patron 130 that patron 130 has x hrs/days/weeks/etc. to perform the verification or his account will be closed/locked. In some cases, patron 130 may be able to participate in gaming and/or gaming related transactions, wager real money and/or win money, even though patron 130 has not completed the verification. In some cases, patron 130 may not be able to withdraw any funds from his account (even deposited funds) and/or may only be able to withdraw limited funds from his account until the verification is completed. In some cases, patron 130 may only be able to wager a portion of the deposited funds until the verification is completed. In some cases, patron 130 may not be able to withdraw any winnings from his account and/or may only be able to withdraw limited winnings from his account until the verification is completed. Here, patron 130 may be able to withdraw deposited funds. In some cases, patron 130 may be able to make a deposit of any amount, or only of a limited amount into his account until the verification is completed. In some cases, patron 130 may only be able to transfer a portion of the deposited funds until the verification is completed.

IV. Verifying Identity and Gaming Permissions Through Computing Device 100 or Agent 150

Referring again to FIGS. 2 and 3, computing device or kiosk 100 or administrative/registrar entity 150 may request that patron 130 submit information as follows, for registration or to commence gaming activities against a previously registered account, or to make a financial transaction:

Personal identification information—name, address, social security number, taxpayer ID, etc. In some cases, this may be scanned from an identification document such as a driver's license.

one, two, three, or more biometric measurements an identification document, for example, a driver's license, passport, or the like a credit card, debit card, stored value card, or similar privately issued card, or other source of funding patron preference for matters such as privacy, problem gaming limitations, etc.

The data/information required may vary depending on the jurisdiction in which the person is located. For example, gaming in New Jersey may require more or less or different information than gaming in Nevada. Computing device or kiosk 100 or administrative/registrar entity 150 may ascertain which jurisdiction patron 130 is physically located or domiciled, or the jurisdiction of game 140, and adapt the registration/access process to the jurisdiction.

The data/information required may vary depending on the type of gaming that patron 130 wishes to participate in, or the stakes for which patron 130 wagers. Computing device or kiosk 100 or administrative/registrar entity 150 may adapt the registration/access process accordingly. For example, play for no money may require less-comprehensive registration or verification than gaming for money, and high-stakes gaming may require more verification than low-stakes gaming. Verification of an 18 year old may be more comprehensive than when patron 130 is 21 years old or older. Also, the Children's Online Privacy Protection Act requires parental consent for children under 13 years old, so computing device or kiosk 100 or administrative/registrar entity 150 may require parental consent and registration for a youthful patron 130.

In some cases, server 142 may prompt computing device or kiosk 100 or administrative/registrar entity 150 to ask patron 130 answers to one or more questions patron 130 provided during registration. Server 142 may provide the answers to computing device or kiosk 100 or administrative/registrar entity 150 so computing device or kiosk 100 or administrative/registrar entity 150 may do a visual comparison, and/or computing device or kiosk 100 or administrative/registrar entity 150 may submit the answers to server 142 for the server to do comparisons.

Some of the information or data collected from patron 130 may be confirmed or verified against various public, government and private databases.

- that various identification information is consistent—for example, that the patron's name, patron's age, and patron's address are consistent with each other.
- that the patron's physical (or virtual) gaming location and/or domicile and identity are consistent with the specific kind of gaming that the patron proposes to engage in.
- checking credit to determine credit worthiness.
- issuing credit for gaming (e.g., running credit reports, etc. with goal to issue funds for credit against future gaming).
- that the patron is not a prohibited person or in a prohibited jurisdiction (e.g., listed with the Office of Foreign Asset Control, or a national of North Korea).
- etc.

In some cases, gaming server 142 may also inform patron 130 that patron 130 can deposit funds into his account, withdraw funds from his account and/or transfer funds between or among accounts by visiting administrative/registrar entity 150 or through computing device 100. Server 142 may provide such information to patron 130 as part of registration and/or the information may be accessible to patron 130 when gaming, for example, via an information/help page, for example.

In some cases, subsequent to registering, patron 130 may physically visit administrative/registrar entity 150 informing administrative/registrar entity 150 that patron 130 needs to complete registration. In response, administrative/registrar entity 150, using computing device 100/152, for example, may access server 142 such as through a dedicated application and/or through a web based application hosted by server 142. Upon accessing server 142, administrative/registrar entity 150 may indicate to the server that administrative/registrar entity 150 is verifying the identity of patron 130, for example, to complete the patron's registration. Server 142 may provide administrative/registrar entity 150 with a list of patron's awaiting verification for administrative/registrar entity 150 to choose from. As another and/or additional example, administrative/registrar entity 150 may enter the name of patron 130 that administrative/registrar entity 150 is attempting to verify/authenticate. As a further and/or additional example, administrative/registrar entity 150 may be required to enter (or have patron 130 enter) the ID(s) 134 assigned to patron 130 during registration. As part of verification, administrative/registrar entity 150 may visually inspect one or more documents provided by patron 130. Administrative/registrar entity 150 may also visually compare patron 130 to a photo ID provided by patron 130.

In particular, to perform verification/authentication, server 142 may provide administrative/registrar entity 150 with information patron 130 provided during registration and administrative/registrar entity 150 may compare that information to the document(s) provided by patron 130. If all information matches including for example, the photo proffered by patron 130 matches to patron 130, administrative/registrar entity 150 may indicate to server 142 that patron 130 is verified. As another and/or additional example, administrative/registrar entity 150 may enter into the system information obtained from the documents provided by patron 130, which information may be conveyed to server 142. Here, server 142 may determine if all information matches and convey back to administrative/registrar entity 150 that patron 130 is verified. Here again, administrative/registrar entity 150 may still need to indicate patron 130 matches a photo ID provided by patron 130. As another and/or additional example, administrative/registrar entity 150 may need to scan a photo ID of patron 130 and submit the scan in addition to a photo of patron 130 taken by administrative/registrar entity 150 to server 142. Here, an administrator of gaming operator 140 may compare the photo and scan as part of the verification. As another and/or additional example, administrative/registrar entity 150 may need to scan one or more documents provided by patron 130 and submit these to server 142, possibly in addition to a scan of a photo ID of the patron and a photo of the patron. Here again, an administrator of gaming operator 140 may analyze all information provided by administrative/registrar entity 150 in connection with information previously provided by patron 130 to perform verification. As another example, administrative/registrar entity 150 may contact an administrator of gaming operator 140 (such as by phone) and verbally verify to the administrator that the person is verified. Other variations are possible including again any variation/combination of the above. In general, regardless of how verification is performed, administrative/registrar entity 150 may need to scan one or more documents provided by patron 130 and submit these to server 142, possibly in addition to a scan of a photo ID of the patron and a photo of the patron.

In some cases, administrative/registrar entity 150, at some time during the verification, may need to submit to server 142 his ID 154. In this fashion, server 142/gaming operator 140 knows that the information is coming from an authorized agent. In the example where administrative/registrar entity 150 speaks with an administrator of gaming operator 140, administrative/registrar entity 150 may need to verbally provide ID 154 and/or submit ID 154 to server 142 via computing system 152.

V. Gaming Activities

Patron 130 may then use screen 312 and keypad 310 to participate in gaming offered on kiosk or computing device 100. The games may be hosted on microprocessor 110 on kiosk 100, or kiosk 100 may operate as a terminal/browser client for games hosted on a remote server. Gaming tasks may be divided among various computers in various ways, for example, betting lines may come from one remote computer, the betting book and patron accounts may be handled on another, and kiosk 100 may manage other parts of the gaming activity.

As patron 130 begins each form of gaming activity, kiosk or computing device 100 or some other gaming device may confirm the legal suitability/permissibility of patron 130 for that specific type of gaming in the specific relevant jurisdictions.

As gaming progresses, patron 130 may request transfers of funds to or from an account maintained by the gaming establishment for gaming at kiosk or computing device 100 and the patron's bank, credit card or other source of funding, or other accounts.

Kiosk or computing device 100 may collect data at each taxable event (for example, a win of a bet, especially a win that takes the patron's winnings for a day above a threshold for W-2G, 1099, or 1042 S reporting) and complete, file, submit and/or print transaction records, forms and reports, including for government and regulatory authorities. If tax withholding information was not gathered during the verification/registration phase, kiosk or computing device 100 may ask patron 130 for that information at any time that patron 130 becomes subject to withholding or reporting requirements.

At the end of gaming activities, patron 130 may request that any portion of the balance remaining in the patron's wagering account be paid out to him or her. Payout may be paid through currency/coin dispenser 702 or may be refunded to one of the patron's bank accounts or credit card account or other account designated as a source of funding. The request for payout may be offered from the kiosk's home page, and kiosk or computing device 100 may then lead patron 130 through a series of screens that ask patron 130 what portion of the current balance of the wagering account is to be paid out, and in what form. Kiosk or computing device 100 may send a receipt or report to the patron's email address.

VI. Handling Funds Through Computing Device 100 or Agent 150

In some cases, patron 130 may also and/or alternatively use administrative/registrar entity 150 to deposit funds into and/or withdraw funds from the patron's account. In some cases, patron 130 may physically visit administrative/registrar entity 150 informing administrative/registrar entity 150 that patron 130 would make a deposit and/or withdrawal funds. In response, administrative/registrar entity 150, using computing system 152, for example, may access server 142 such as through a dedicated application and/or through a web based application hosted by server 142. Upon accessing server 142, administrative/registrar entity 150 may indicate to the server that administrative/registrar entity 150 is making a withdrawal and/or making deposit. Server 142 may provide administrative/registrar entity 150 with a list of patrons 130 to choose from. As another and/or additional example, administrative/registrar entity 150 may enter the name of patron 130. As a further and/or additional example, administrative/registrar entity 150 may be required to enter (or have patron 130 enter) the ID(s) 134 assigned to patron 130 during registration. Assuming patron 130 is in the system and can identified by server 142, server 142 may pull one or more pieces of information from the patron's account, such as the patron's account balance, and may provide that information to computing system 152. Server 142 also provide a photo of the patron to computing system 152 and request administrative/registrar entity 150 to visually verify the photo matches the patron. Administrative/registrar entity 150 may be required to respond to server 142 that there is a match. Server 142 also provide an account status such as locked, partially locked, or unlocked thereby indicate whether patron 130 may or may not be able to make a deposit and/or withdrawal and/or may or may not be able to make a partial deposit and/or partial withdrawal.

Assuming patron 130 is seeking to make a deposit and the account is open, administrative/registrar entity 150 may physically receive funds (such as cash, check, money order, etc.) from patron 130 and communicate to server 142 the amount of received funds. In response, server 142 may add the funds to the patron's account. Alternatively, patron 130 may indicate that the funds should be transferred to the gaming account from some other account, such as from a credit card or other source of funding. Here, administrative/registrar entity 150 may receive the account information from patron 130 and submit such information to server 142 such that the server may effectuate the transfer and add the funds to the patron's account (note that in some cases, through the use of administrative/registrar entity 150, there is some reassurance to gaming operator 140 that the account from which funds are being taken is indeed the patron's account.) Regardless, the server may then communicate a receipt to patron 130 via email, text, etc. The server may also and/or alternatively communicate a receipt to computing system 152 for the patron's inspection and/or for printing by administrative/registrar entity 150 for patron 130. Server 142 may also display on computing system 152 the patron's adjusted balance. Other means may be used to convey a verification of account status to patron 130. As another example, upon receiving funds from patron 130, administrative/registrar entity 150 may alternatively and/or in addition speak with an administrator of gaming operator 140 and indicate that administrative/registrar entity 150 has received funds from patron 130 and that the patron's account balance should be adjusted accordingly. Again, a receipt may be communicated to patron 130 in various fashions such as through email, text, by communicating a receipt to computing system 152 for printing, etc. Other and/or additional variations are possible.

As part of making a deposit to a patron's account, administrative/registrar entity 150, at some time during the deposit, may need to submit to server 142 his ID 154. In this fashion, server 142/gaming operator 140 knows that an authorized agent has the funds. In the example where administrative/registrar entity 150 speaks with an administrator of gaming operator 140, administrative/registrar entity 150 may need to verbally provide ID 154 and/or submit ID 154 to server 142 via computing system 152.

Assuming patron 130 is seeking to make a withdrawal and the account is open, administrative/registrar entity 150 may communicate to server 142 that amount of funds patron 130 wishes to withdraw. In response, server 142 may determine if such requested amount can be withdrawn (e.g., does the account have sufficient funds) and/or a lesser amount that can be withdrawn and accordingly withdraw the funds from the patron's account/adjust the account balance. The server may then communicate to computing system 152 the amount withdrawn (again, which amount may be less than requested). In turn, administrative/registrar entity 150 may then hand to patron 130 the indicated amount of funds (e.g., in cash, check, money order, etc.). Alternatively, patron 130 may indicate that the funds should be transferred from the gaming account to some other account, such as a credit card account or other source of funding. Here, administrative/registrar entity 150 may receive the account information from patron 130 and submit such information to server 142 such that the server may effectuate the transfer and remove the funds to the patron's account and add the funds to the designated account (in some cases, through the use of administrative/registrar entity 150, there is some reassurance to gaming operator 140 that the account to which funds are being transferred is indeed the patron's account). The server may then communicate a receipt to patron 130 via email, text, etc. The server may also and/or alternatively communicate a receipt to computing system 152 for the patron's inspection and/or for printing by administrative/registrar entity 150 for patron 130. Server 142 may also display on computing system 152 the patron's adjusted balance. Other means may be used to convey a verification of account status to patron 130. As another example, administrative/registrar entity 150 may alternatively and/or in addition speak with an administrator of gaming operator 140 and indicate that patron 130 wishes to withdrawal funds and that the patron's account balance should be adjusted accordingly. Similar to above, the administrator of gaming operator 140 may determine an amount, if any that can be withdrawn, and communicate such to administrative/registrar entity 150. Again, a receipt may be communicated to patron 130 in various fashions such as through email, text, by communicating a receipt to computing system 152 for printing, etc. Other and/or additional variations are possible.

As part of making a withdrawal from a patron's account, administrative/registrar entity 150, at some time during the withdrawal, may need to submit to server 142 his ID 154. In this fashion, server 142/gaming operator 140 knows that an authorized agent is making the request and that funds are being properly dispersed to patron 130. In the example where administrative/registrar entity 150 speaks with an administrator of gaming operator 140, administrative/registrar entity 150 may need to verbally provide ID 154 and/or submit ID 154 to server 142 via computing system 152.

In some cases, patron 130 may also and/or alternatively use administrative/registrar entity 150 to transfer funds between multiple gaming accounts of patron 130. For example, gaming operator 140 may require patron 130 have different accounts for different types of gaming or retail activity. For example, patron 130 may have one account for wagering/betting on sports, one account for wagering/betting on casino type games, one account for wagering/betting on interactive games (like poker), and one account for retail activity such as food, entertainment, or nightclubs at host casino. As another example, patron 130 may have multiple accounts with different gaming operators 140. In some cases, patron 130 may physically visit administrative/registrar entity 150, informing administrative/registrar entity 150 that patron 130 would like to transfer funds between accounts. Assuming the accounts are with the same gaming operator, administrative/registrar entity 150, using computing system 152, for example, may access a server 142 of the provider as similarly discussed above, and then instruct the server to transfer funds between the accounts, as similarly discussed above. Assuming the accounts are with different gaming operators, administrative/registrar entity 150, using a computing system 152, for example may access a server 142 of each gaming operator as similarly discussed above, and withdrawal the funds from one account and deposit the funds into another account, as similarly discussed above. Between transfers, administrative/registrar entity 150 may place the funds in an account of administrative/registrar entity 150. Other variations are possible to transfer funds between accounts.

In some cases, administrative/registrar entity 150 may charge and/or collect a fee from patron 130 and/or gaming operator 140 for assisting in the registration of patron 130, for depositing funds into a patron's account, and/or for withdrawing funds from a patron's account.

In some cases, a computing device or kiosk 100 with a camera and face recognition software, or with other biometric sensors, may provide additional account security to permit financial services transactions that are not traditionally available at a routine ATM. For example, most banks limit maximum withdrawals to $1000 or some similar amount. With the additional identity verification permitted by one, two, three, four, or more biometric sensors, a bank may permit a larger withdrawal, or may permit transactions that are not routinely available with simple entry of a four-digit PIN.

VII. Regulatory and Financial Records, Statements, and Reporting

Kiosk or computing device 100, or gaming server 142, or another computer of the computing system may be programmed to gather information to ensure compliance with gaming regulations, tax laws, financial monitoring laws (for example, money laundering, Foreign Corrupt Practices Act, and similar laws), and for financial reporting.

In some cases, patron 130 via computing device 100 and/or via an agent/computing system 152 may be able to obtain from gaming operator 140 via server 142, for example, each amount patron 130 has won, each amount patron 130 has lost, total winnings, total losses, and/or net losses or winnings. Such a report may be over a specified duration of time, such as a given month or months, a given calendar year, etc. In the event patron 130 has multiple accounts with a given gaming operator, the report may be over each account and a summary for all accounts. In some cases, administrative/registrar entity 150, such as through computing device 100, may generate such a report for patron 130 if patron 130 has accounts across multiple gaming operators 140. In some cases, patron 130 may be able to use such a report(s) for tax reporting purpose to one or more jurisdictions (such as a country, state, city, federal, or other geographical region or tax jurisdiction.)

Computing device or kiosk 100 may permit patron 130 to obtain account statements for:
  personal tax reporting—for example, patron 130 may be able to request tax statements relating to his or her gaming activities, which could be delivered electronically or by mail
  gaming activities (e.g., win/loss statements, points accumulation, etc.)
  retail activities (e.g., restaurant consumption use, resort activity, etc.)

Computing device or kiosk 100 may permit gaming operator 140 to file reports required by government and regulatory authorities, including:

SARC (Suspicious Activity Report for Casinos) filings—for example, if patron 130 engages in a transaction that requires SARC filing, then the system would recognize the event and automatically file a SARC.

Any other regulatory, tax, etc. filings.

VIII. Other Features

Kiosk 100 may be programmed to function as an ordinary ATM, once a person inserts a traditional ATM card into card acceptor 522. Similar, kiosk or computing device may be programmed to accept large bills and provide small bills, simply to make change for patrons.

Printer 712 may be used to print various receipts of registration, deposit, or withdrawal or transaction records, forms and reports. Printer 712 may also be used to print bar coded tickets with negotiable value. Receipts or transaction records, forms and reports may be sent to the patron's email account or by SMS to the patron's telephone.

Nonvolatile storage may be used to journal patron-visible transactions, machine errors, and patron-invisible machine state transitions. Events journaled may include various errors, deposits, payouts, and the like. The journal may be printed on printer 712, emailed to the managing operator's office, or the like.

Microprocessor 110 of kiosk or computing device 100 may support a number of management/maintenance operations, such as inquiries of cash inventor, cash taken in or paid out, bill rejections, and the like.

IX. Computer Implementation

Various processes described herein may be implemented by appropriately programmed general purpose computers, special purpose computers and computing devices. Typically a processor (e.g., one or more microprocessors 110, one or more microcontrollers, one or more digital signal processors) will receive instructions (e.g., from a memory or like device), and execute those instructions, thereby performing one or more processes defined by those instructions. Instructions may be embodied in one or more computer programs, or one or more scripts. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

In some cases, kiosk or computing device 100 may be a "thin client," with almost all processing performed at a central server. In other cases, kiosk or computing device 100 may be software-heavy, hosting most of the management operations, device operations, gaming activities, etc. Kiosk or computing device 100 may have one or multiple microprocessors 110. A server computer or centralized authority may or may not be necessary or desirable. In various cases, the network may or may not include a central authority device. Various processing functions may be performed on a central authority server, one of several distributed servers, or other distributed devices. Tasks and computation may be divided as convenient.

Programs and data may be stored in various media appropriate to the purpose, or a combination of heterogeneous media that may be read and/or written by a computer, a processor or a like device. The media may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, electromagnetic domains or spots, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes. Alternative database structures to those described may be readily employed. Databases may be stored locally or remotely from a device which accesses data in such a database.

Processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

A computer network system may be used for gaming or other financial transactions. System may include one or more gaming operators 140, one or more administrative/registrar entities 150, and a plurality of patrons 130. Network 102 may include a public and/or private network(s) and be a wired and/or wireless network based on any type of technology. Network 102 may include in part the Internet.

Any given patron 130 may engage in gaming activities through one or more computing systems 100 such as a computer, server, laptop, computing pad, smart phone etc. that may intercommunicate with a server 142, for example, and/or one or more other computing systems 100 of other patrons 130. A computing device 100 may be dedicated to interworking with gaming operator(s) 140/server 142 and or may be a general purpose device. Such a computing system may include one or more processors and one or memories and/or be interfaced to one or more external memories, such as one or more and/or databases. Computing device 100 may include one or more network hardware/software/firmware 320 based interfaces that enable the device to connect to and communicate over network 102. Computing device 100 may also include one or more software and/or firmware and/or hardware based application(s) that execute on the computing system to intercommunicate with gaming operator 140/server 142 and/or other patrons/computing devices 100 to participate in gaming, for example. As another example, computing device 100 may interwork with gaming operator 140/server 142 through a web based application hosted by server 142. Other variations are possible.

Gaming operator 140 may provide gaming services to patrons 130, offering one or more types of gaming activities to patrons 130. Such games may include, for example, any one or more of:

Games where patron 130 may bet/wager against a house entity 140. Such games may include, e.g., casino type games such as card games (e.g., blackjack, baccarat), dice games (e.g., craps), roulette, slots, etc. These games may be virtual games (e.g., use computer generated cards, dice, roulette wheel spins, slot machine reel spins) in which game outcomes/game results are based on/determined from random number generator(s), for example. As another example, these games may be non-virtual games in which game outcomes/game results are based on actual cards, dice, roulette wheel spins, slot machine reel spins, etc. As another example, these games may be a combination of both.

Games where patron 130 may bet/wager on sporting events, including, for example, football, soccer, basketball, baseball, hockey, horses, dogs, cars, etc.

Games where patron 130 may participate in fantasy sporting events, including, for example, football, soccer, basketball, baseball, hockey, horses, dogs, cars, etc.

Interactive games where patron 130 wagers against one or more other patrons, for example. Such games may include casino type games such as card games (e.g., poker). These games may be virtual games (e.g., use computer generated cards) in which game outcomes/game results are based on/determined from random generator(s), for example. As another example, these games may be non-virtual games in which game outcomes/game results are based on actual cards.

Games may include fantasy sporting events in which patrons wager against one another. As another example, such games may be video games in which patrons wager against patrons. As another example, such games may include games of chance, semi-chance, or skill, such as chess, checkers, board games, Scrabble, Risk, etc.

Lottery/lotto games where patron 130 may choose one or more numbers, for example, lottery, keno, bingo, etc., or may include an electronic scratch card. These games may be virtual games in which selected numbers, for example, to determine game outcomes are based on/determined from random generator(s), for example. As another example, these games may be non-virtual games in which selected numbers, for example, to determine game outcomes are based on/determined from actual numbers pulled from hoppers, for example.

Games where patron 130 wagers on external events, such as weather, movies, elections, game shows, time of birth or name to be assigned by celebrity parents of soon-to-be-born babies, etc.

gambling, betting, wagering, gaming, games, fantasy sports, tournaments, leagues, social games, skill games, play-for-fun, promotions, sweepstakes and contests and fantasy or virtual sports, exchanges or markets.

Patron 130 may wager against a house type entity/book maker (e.g. gaming operator 140) and/or be wagered against other patrons (e.g., side bets in craps), and/or in pari-mutuel against other bettors, and/or other arrangements.

Patron 130 may wager real money/currency, points/tokens/credits/digital currency/etc. that patron 130 purchases with real money, and/or points/tokens/credits/digital currency/etc. that patron 130 is assigned but that patron 130 does not purchase with real money.

These games are merely examples; gaming operator 140 may offer other types of games.

Entity 140 may be a casino, book maker, racing track, internet gaming operation, or other gaming operator, or may be a financial institution such as a bank or other financial entity that needs verification of customer identity.

Gaming operator 140 may own and/or operate one or more computing systems (e.g., servers) 142. (The use of the term "server" is non-limiting, and that other types of computing systems may be used.) Server 142 may include one or more processors and one or memories and/or be interfaced to one or more external memories, such as one or more databases. Server 142 may include one or more network hardware/software/firmware based interfaces 100 that enable the server to connect to and communicate over network 102. Server 142 may also include one or more software and/or firmware and/or hardware based application(s) 100 that execute on the server. One or more of such applications may be web based applications. As an example, such applications may include actual games offered by gaming operator 140, and administrative applications 100 such as patron account balance management, patron registration/signup, etc.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server, but outputs display information to and receives patron input information from a local patron computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

Where databases are described, (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, alternative spectrum, commercial on-line casinos, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back into plaintext. An example of an asymmetric key algorithm is the RSA algorithm.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

The invention claimed is:

1. A computing device for gaming by patrons, comprising:
at least one processor, at least one identification acceptor and at least one biological sensor, configured to permit installation at a site for interaction with human patrons;
the at least one identification acceptor being configured to scan identification information from an identification document into digital form for transmission over a communication network;
the at least one biological sensor being configured to obtain biological data describing a given human patron in digital form for transmission over the communication network;
in which the at least one processor is configured to control:
  obtaining a digital form of the given human patron's identification from the at least one identification acceptor;
  obtaining biological data describing a biological feature of the given human patron from the at least one biological sensor;
  verifying identity of the given human patron and acceptability of the given human patron for gaming based at least in part on the digital form of the given human patron's identification and the biological data;
  verifying the identity of the given human patron against a legal identity to validate legal entitlement to participate in gaming activities;
  on verification, offering gaming activities to the verified given human patron;
  accepting funds at a funds acceptor of the computing device for deposit into an electronic wallet held for wagering activities hosted in first and second off-site computers respectively of first and second gaming operators; and
  transferring an amount of the funds, using the electronic wallet, between a first account of the first gaming operator and a second account of the second gaming operator.

2. The computing device of claim 1, in which the first and second gaming operators are different, and in which the first and second gaming operators are distinct legal entities from an operator of the computing device.

3. The computing device of claim 1, further comprising:
a currency acceptor and dispenser mounted in a housing of the computing device and configured to accept currency and dispense currency for gaming; and
in which the at least one processor is configured to control:
  paying out gaming winnings at the currency acceptor and dispenser.

4. The computing device of claim 1, wherein:
the at least one biological sensor is a camera and the biological data is a digital image of a face of the given human patron captured by the camera.

5. The computing device of claim 4, in which the at least one processor is configured to control verifying the identity of the given human patron based at least in part on face recognition and comparison of the digital image against a reference photograph.

6. The computing device of claim 5, in which the at least one processor is configured to control verifying the identity of the given human patron based at least in part on a verification received, over a communication network, from an off-site verification office in response to the digital image of the given human patron's face and at least part of the digital form of the given human patron's identification.

7. The computing device of claim 1, wherein:
the at least one biological sensor is a signature pad and the biological data is a digital representation of a signature of the given human patron.

8. The computing device of claim 1, in which the at least one processor is configured to control verifying the identity of the given human patron based at least in part on information regarding a financial account of the given human patron.

9. The computing device of claim 1, in which the at least one processor is configured to control verifying the identity of the given human patron based at least in part on analysis of the biological data against a reference in a memory of the computing device.

10. The computing device of claim 1, in which the at least one processor is configured to control verifying the identity of the given human patron based at least in part transmitting, over a communication network, the biological data to an off-site verification office.

11. The computing device of claim 1, further comprising: a currency acceptor and dispenser.

12. The computing device of claim 1, further comprising: an acceptor for at least one of a credit, debit, stored value, or ATM card.

13. The computing device of claim 1, wherein:
the at least one identification acceptor is configured to accept and scan at least one of a government-issued driver license, passport, or identification card.

14. The computing device of claim 1, in which the at least one processor is configured to control conducting gaming activities against a patron wagering account held in a remote computer.

15. A computing device for gaming by patrons, the computing device comprising:
at least one processor and a funds acceptor configured to be communicatively coupled, and for installation at a site for interaction with human patrons;
in which the funds acceptor is configured to accept funds for gaming;
an identification acceptor configured to scan identification information from an identification document into digital form for transmission over a communication network;
a biological sensor configured to obtain biological data describing a given human patron at the computing device into digital form for transmission over the communication network;
in which the at least one processor is configured to control:
obtaining a digital form of the given human patron's identification from the identification acceptor;
obtaining biological data describing a biological feature of the given human patron from the biological sensor;
accepting funds at the funds acceptor for deposit into an electronic wallet held in an off-site computer;
verifying identity of the given human patron and acceptability of the given human patron for gaming based at least in part on the digital form of the given human patron's identification and the biological data;
on verification and acceptance of funds, offering gaming activities to the verified given human patron out of the electronic wallet;
transferring an amount of the funds, using the electronic wallet, between a first account of a first gaming operator and a second account of a second gaming operator; and
paying out gaming winnings from the electronic wallet at a currency dispenser.

16. The computing device of claim 15, in which the at least one processor is configured to control:
verifying the identity of the given human patron against a legal identity to validate legal entitlement to participate in gaming activities; and
accepting funds at the funds acceptor for deposit into the electronic wallet held for wagering activities hosted in first and second off-site computers respectively of the first and second gaming operators, in which the first and second gaming operators are different, and in which the first and second gaming operators are distinct legal entities from an operator of the computing device.

17. The computing device of claim 15, further comprising:
an acceptor for at least one of a credit, debit, stored value, or ATM card, digital currency, or gaming points.

18. A method comprising:
controlling by at least one processor of a computing device having an identification acceptor configured to scan identification information from an identification document into digital form for transmission over a communication network, a biological sensor configured to obtain biological data describing a human patron in digital form for transmission over the communication network, and an input-output device configured to accept registration/login information and gaming commands from a human patron and to present information to the human patron for interactive gaming:
accepting registration and identification information from the human patron at the input-output device;
obtaining a digital form of the human patron's identification from the identification acceptor;
obtaining biological data describing a biological feature of the human patron from the biological sensor;
verifying identity of the human patron against a legal identity to validate legal entitlement to participate in gaming activities;
verifying the identity of the human patron and acceptability of the human patron for gaming based at least in part on the digital form of the human patron's identification and the biological data;
accepting funds at a funds acceptor for deposit into an electronic wallet held for wagering activities hosted in first and second off-site computers respectively of first and second gaming operators;
transferring an amount of the funds, using the electronic wallet, between a first account of the first gaming operator and a second account of the second gaming operator and
on verification, offering gaming activities to the verified human patron.

19. The method of claim 18,
in which the first and second gaming operators are different, and in which the first and second gaming operators are distinct legal entities from an operator of the computing device.

20. The method of claim 18, in which the at least one processor is configured to control:
  paying out gaming winnings at a currency acceptor and dispenser mounted in the computing device and configured to accept currency and dispense currency for gaming.

\* \* \* \* \*